July 1, 1958  O. B. SHERMAN  2,840,854
METHOD AND APPARATUS FOR SEALING CONTAINERS
Filed Sept. 2, 1955  4 Sheets-Sheet 1

INVENTOR
ORVILLE B. SHERMAN
BY
Rule and Hoge
ATTORNEYS

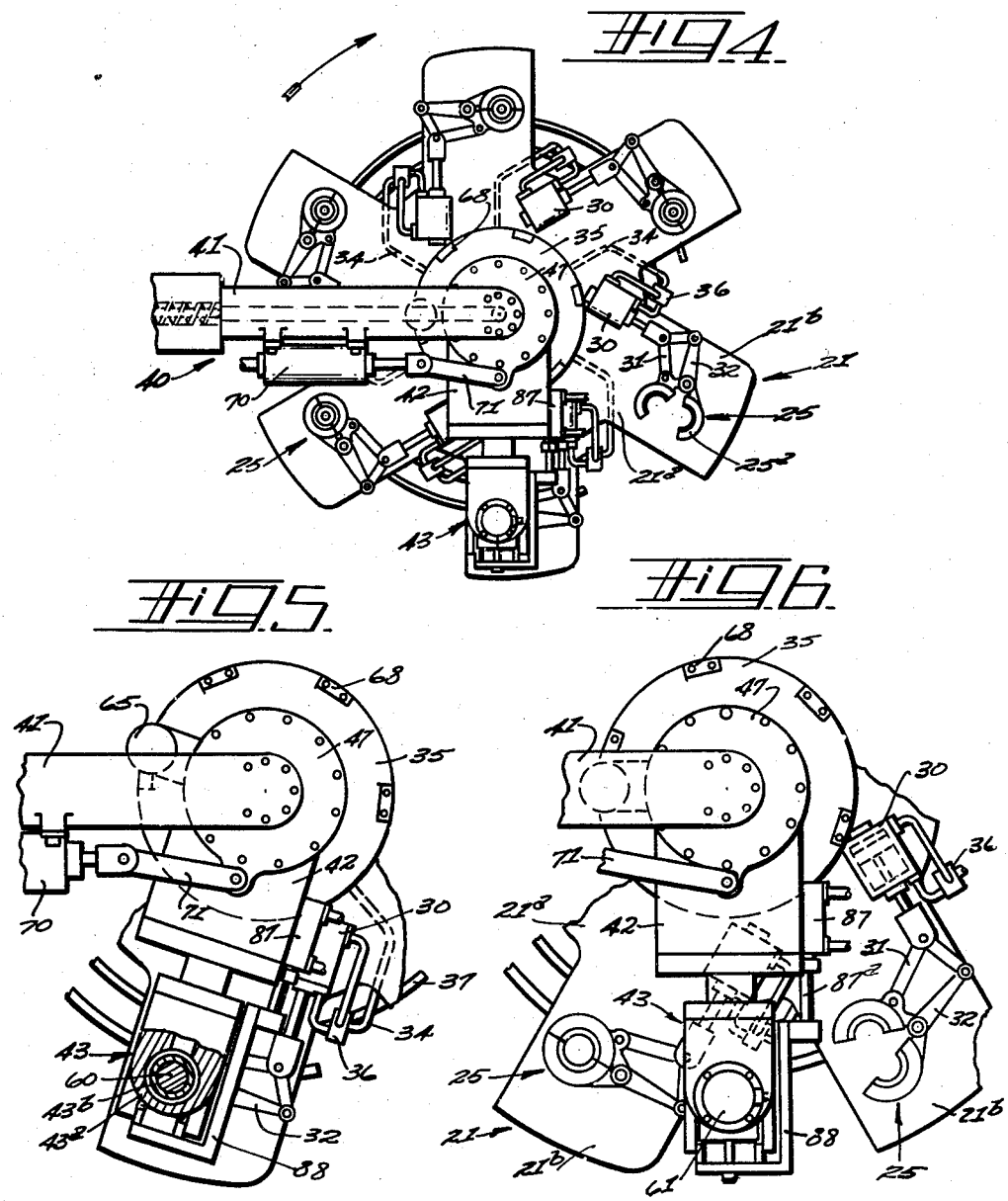

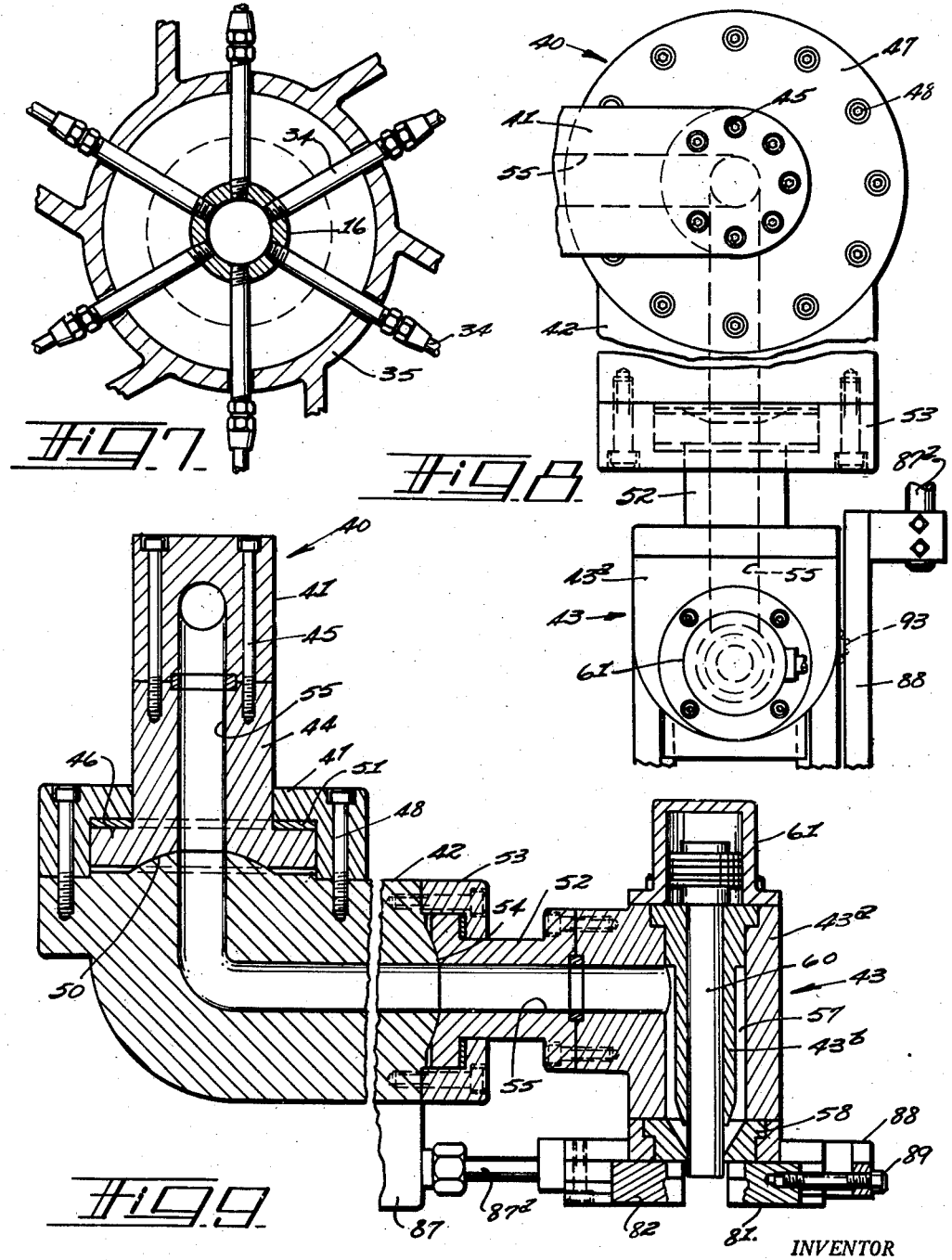

July 1, 1958     O. B. SHERMAN     2,840,854
METHOD AND APPARATUS FOR SEALING CONTAINERS
Filed Sept. 2, 1955     4 Sheets-Sheet 4
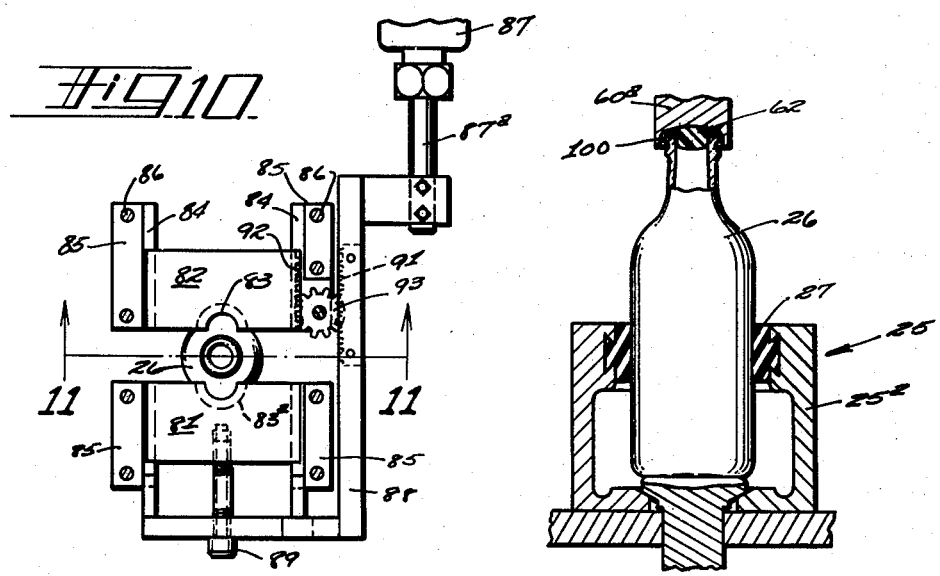
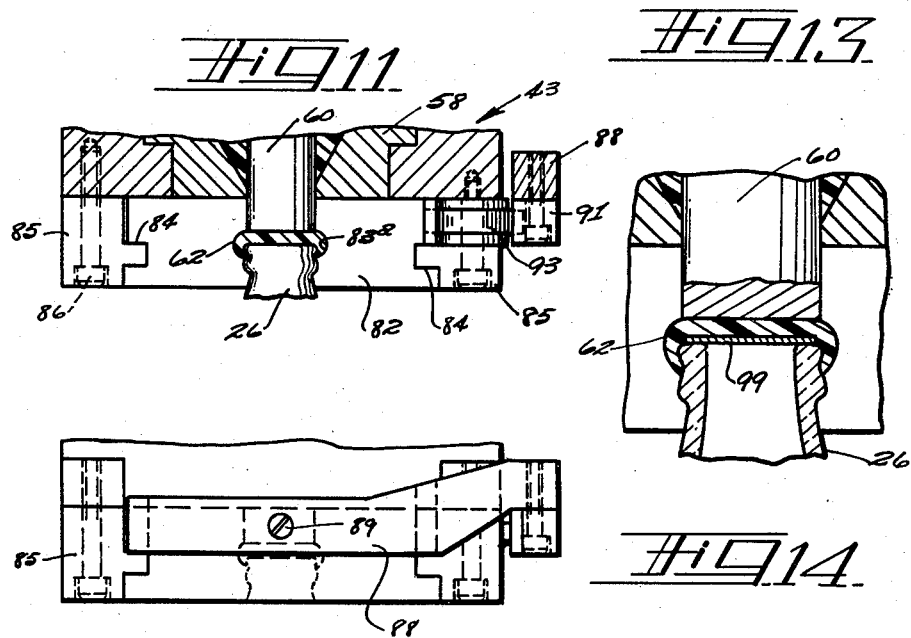
INVENTOR
ORVILLE B. SHERMAN
BY
Rule and Hoge.
ATTORNEYS

United States Patent Office

2,840,854
Patented July 1, 1958

2,840,854

METHOD AND APPARATUS FOR SEALING CONTAINERS

Orville B. Sherman, Toledo, Ohio, assignor to Owens-Illinois Glass Company, a corporation of Ohio Application September 2, 1955, Serial No. 532,164

14 Claims. (Cl. 18—5)

My invention relates to methods and apparatus for use in closing and sealing containers such as bottles, jars, tubes, and other articles. The invention provides a method and means for extruding a plastic material from an extrusion device, severing individual portions from the material as it is extruded, and shaping and applying the material directly to the mouth of the bottle or other container, and sealing it to the container while the material is in a plastic, moldable condition. The material used for closing and sealing the containers may be any of the usual thermoplastic materials which are in a molten or plastic moldable condition while at an elevated temperature and which harden or solidify upon cooling, or in general, any moldable material which will harden or solidify after being applied to the container.

As herein illustrated and described the invention is used for capping and sealing bottles which may consist of glass or any one of various thermoplastic materials now used or usable in the manufacture of such containers. The invention however is not limited to such articles. The container itself may be a molded plastic material and in accordance with my invention a measured amount of sterile plastic of the same material may be extruded from an extrusion head, applied to the mouth or finish of the container after the latter has been filled with any desired commodity. Such sterile extruded plastic is applied to the container and forms a permanent, sterile hermetic seal. With such plastic containers the seal is positive and reliable as the extruded plastic heat seals to the plastic container.

When it is desired to seal containers made of glass or other materials than the plastic used for sealing, the finish or mouth portion of the container may be designed to have indentations, projections, or other contour such that the sealing material is positively locked in place on the container.

In one of my methods of sealing a container, a stiff liner is placed over the mouth of the container before the sealing plastic is applied, thereby preventing entry of the extruded plastic inside of the container mouth. The present invention further contemplates the use of extruded plastic material molded in place and used as a tamperproof seal applied over a metal or plastic preformed cap.

As an alternative method to that of completely molding the plastic closure in place, a loosely fitting preform may be molded and then transferred to the mouth or finish of the container while at a sufficiently high temperature or sufficiently plastic to be further molded. It is then permanently locked and sealed in place by a crimping or other reforming operation. For example, polystyrene caps molded at an elevated temperature may be removed from the mold immediately after the mold pressing operation at which time they are sufficiently rigid to maintain their shape while handled with care. They then may be applied to the container and reshaped and sealed to the container by the application of moderate forces.

Referring to the accompanying drawings:

Fig. 4 is a plan view of the machine;

Fig. 5 is a part sectional plan view, with parts broken away, showing the oscillating extruder head;

Fig. 6 is a similar view showing the extruded head in an intermediate position;

Fig. 7 is a part sectional plan view of an air distributor;

Fig. 8 is a plan view, with parts broken away, of the extruder;

Fig. 9 is a sectional elevation, with parts broken away, of the extruder;

Fig. 10 is a plan view showing a mold for the closure and mold operating means;

Fig. 11 is a section at the line 11—11 on Fig. 10;

Fig. 12 is an elevational view of parts shown in Fig. 10;

Fig. 13 is a sectional elevation showing a gripping device or holder for the container and means for molding the closure on to the mouth of the container; and Fig. 14 is a part sectional detail view of a modification in which a liner is interposed between the bottle finish and the plastic seal.

Figure 1:
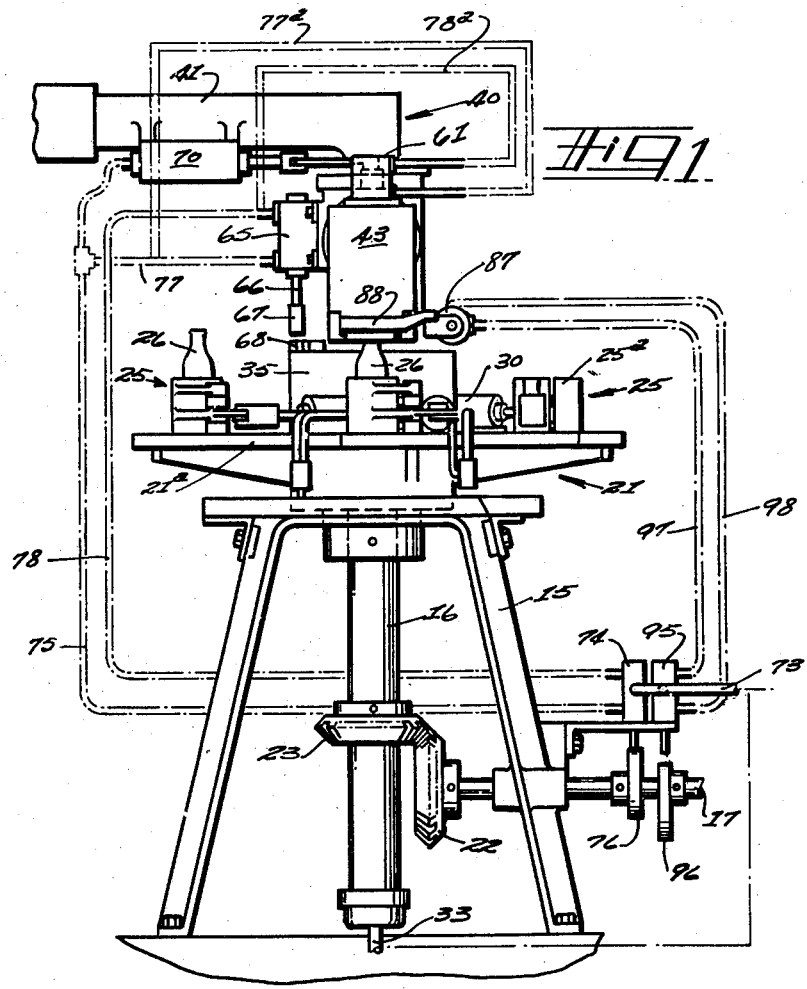
Fig. 1 is an elevational view, partly diagrammatic of a machine for use in practicing my invention.

Referring particularly to Figs. 1 and 4, the machine comprises a frame 15 in which is journalled a vertical tubular column 16. A drive shaft 17 is rotated continuously by a motor (not shown). A carriage 21 keyed to the column 16, is rotated continuously by power transmitted through gears 22 and 23 keyed respectively to the shaft 17 and column 16. The carriage 21 includes a table 21ᵃ formed with radially disposed wings 21ᵇ (Fig. 4) on each of which is mounted an article gripping device 25 and means for operating the same. Each of the gripping devices 25 includes a pair of gripping jaws 25ᵃ (Figs. 4 and 13) adapted to grip the bottle 26 or other container placed on the table 21. The jaws 25ᵃ may be lined with rubber 27 or like material.

Figure 2:
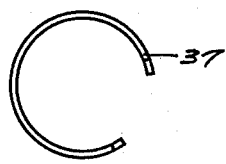
Fig. 2 is a plan view of a cam for operating an air pressure control valve.
Figure 3:
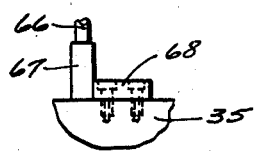
Fig. 3 is a detail view showing means providing a driving connection between the oscillating extrusion head and the rotating carriage.

Each gripping device 25 is operated by a piston motor or cylinder 30 operatively connected to the gripping jaws through links 31, 32. Air under pressure for operating the cylinders 30 is supplied through a pressure pipe 33 (Fig. 1) opening into the tubular column 16. The air is distributed from the column 16 through pipes 34 (Figs. 7 and 4) radiating therefrom. The pipes 34 extend through openings in a distributing head or drum 35 which forms a part of the carriage 21. The air supply to each motor 30 is controlled by a valve 36 which, as the carriage rotates, is actuated by a stationary arc-shaped cam 37 (Figs. 2 and 5) concentric with the axis of the carriage. While the valve 36 is riding along the cam, it is held in position to supply air pressure to the motor 30 for holding the gripping jaws 25ᵃ closed around the workpiece 26. When the valve runs off the came the motor 30 is reversed and the jaws 25ᵃ are opened.

The extruder 40 as shown in Figs. 1, 8, and 9 includes a horizontal stationary arm 41 with its outer end positioned over the center column 16, and a horizontal arm 42 having a pivotal connection with the arm 41 and extending radially of the carriage 21. An extrusion head 43 is connected to the outer end of the arm 42, over the path of the bottles 26 on the carriage.

Means for pivotally connecting the arms 41 and 42, as shown in Fig. 9 comprises a cylindrical connector 44 secured to the arm 41 by bolts 45. The connector 44 is formed with a flange 46. A cap 47 attached by bolts 48 to the arm 42 extends over the flange 46. This construction permits the arm 42 to oscillate about the axis of the connector 44. The arm 42 and connector 44 are formed with spherical bearing surfaces 50 providing a ball and socket joint which permits a limited universal movement of the arm 42 thus permitting the extrusion head 43 to adjust itself to the bottle 26 when applied to the latter as presently described. A pad 51 beneath the cap 47 permits such limited adjusting movement of the arm 42. The extrusion head 43 is connected to the arm 42 through a connector 52 and cap 53, the construction being substantially similar to that abovedescribed comprising the connector 44 and cap 47. A ball and socket joint 54 is thus provided between the arm 42 and head 43 permitting the latter to adjust itself to the container 26.

The extruder is formed with a channel or passageway 55 through which the plastic material at an elevated temperature and in a plastic or molten condition is transmitted to the extrusion head 43. This material may be supplied and maintained at a uniform temperature and pressure provided by an air recirculation system such as shown and described in the copending application of Sherman et al., Serial Number 441,394, filed July 6, 1954, for Method and Apparatus for Feeding Plasticized Materials.

The extrusion head 43 (Fig. 9) includes an outer member 43$^a$ and an inner member 43$^b$ formed to provide an annular passageway 57 in communication with the channel 55 and through which the plastic material is forced downwardly in tubular form and extruded through a nozzle 58. A plunger 60 extending vertically downward through the extrusion head is reciprocated vertically by a piston motor 61 as hereinafter described. The plunger when retracted permits a flow of the plastic through the nozzle 58. Downward movement of the plunger, which may have a close fit within the mouth of the nozzle, then severs a measured amount or gob 62 (Fig. 11) which is to form a closure cap for closing and sealing the container 26. The cap or closure 62 is molded as hereinafter described.

As the carriage 21 rotates continuously the bottles 26 thereon are brought in succession beneath the extrusion head 43 when the head is in the Fig. 6 position. The head then advances with the container through the capping zone in which the capping material is applied to the container. The extrusion head is then returned for cooperation with the next container. The means for oscillating the extrusion head is as follows: A piston motor 65 (Fig. 1), mounted on the extrusion head 43, comprises a vertically reciprocating piston rod 66 with a head 67 which is projected downwardly into the path of driving lugs 68 on the periphery of the drum 35. The head 67 serves as a connector between the extrusion head and the carriage 21. When the head 67 is projected downward into the path of the lugs 68 the extrusion head 43 is driven by the carriage 21 through the capping zone. The connector 67 is then retracted and the extrusion head is returned by a piston motor 70 (Figs. 1 and 4) mounted on the arm 41. The piston rod of the motor 70 is connected through a link 71 to the cap plate 47. Air for operating the cylinder 70 is supplied through a pressure pipe 73 (Fig. 1), a control valve 74 and a pipe 75. The valve 74 is operated by a cam 76 on the drive shaft 17. The air supply to the motors 65 and 61 is also controlled by the valve 74 connected to the motors through the pipe 75 and branch pipes 77 and 77$^a$. Air pressure is supplied to the motor 65 through a pipe 78 for lowering the connector 67, and through a branch pipe 78$^a$ for lowering the plunger 60.

The means for molding the extruded material 62 into the form of a closure cap and applying it to the containers comprises a cap mold including a pair of molding sections or plates 81 and 82 (Fig. 10) formed with semicircular recesses 83 to receive the plunger 60 when the mold is closed. The plates 81 and 82 are mounted for reciprocating movement in guideways 84 in a frame 85 attached by bolts 86 to the lower surface of the extrusion head 43. The molding plates 81 and 82 are actuated by a motor 87 mounted on the arm 42 and having its piston rod 87$^a$ connected to a frame 88 which has an adjustable connection through an adjusting bolt 89 with the plate 81. A rack 91 on the frame 88 and a rack 92 on the plate 82 run in mesh with a pinion 93. The motor 87, operating through this rack and pinion, moves the mold plates 81 and 82 to and from a molding position in which a mold cavity 83$^a$ surrounds the neck end of the bottle 26.

The operation of the motor 87 is controlled by a valve 95 (Fig. 1) actuated by a cam 96 on the drive shaft 17. Pipe lines 97 and 98 extend from the valve to opposite ends of the motor 87. The operation of the valve 95 is timed to close the cap mold 81, 82 immediately after the mold has been brought into register with the workpiece 26. The plunger 60 then moves downward severing the measured charge 62 of plastic, forcing it downward on to the workpiece 26 and shaping it in the cap mold 81, 82.

The operation of the machine is as follows: Assuming the extrusion head 43 to be at the end of its forward travel with the carriage 21 as shown in Fig. 5 and a bottle 26 placed in the open jaws 25$^a$ (Fig. 4), the cam 76 (Fig. 1) operates valve 74 to supply air to motors 61, 65 and 70 for lifting the plunger 60, withdrawing the head 67 and operating the motor 70. The motor 70 swings the extrusion head 43 in a counterclockwise direction to the Fig. 6 position. The valve 74 is then reversed, lowering the plunger 60 and thereby lowering the connector head 67 in front of, but spaced forwardly from a driving lug 68. As the bottle 26 is brought beneath the extrusion head, the driving lug 68 picks up the extrusion head and carries it forward with the carriage 21 through the capping zone.

When the extrusion head is brought into register with the bottle the motor 87 is actuated under the control of the valve 95 to close the cap forming mold 81, 82 around the neck end of the bottle 26. The plunger 60 when moved downward severs the extruded gob 62 at the mouth of the nozzle 58 and forces it downward into the mold cavity 83$^a$ so that the closure cap is molded into shape and sealed to the mouth of the bottle. The bottle 26 which at this time has been filled with some food product or other desired commodity, may be hot and in a sterile condition so that the bottle with its contents is hermitally sealed by the thermoplastic cap 62 which is also hot and in a sterile condition. The plunger 60 is then withdrawn upwardly, the motor 87 reversed thereby opening the cap mold. At the end of the travel of the extrusion head 43 with the carriage 21 the motor 61 withdraws the plunger 60, the motor 65 withdraws the head 67 and the motor 87 opens the cap mold. The capped bottle remains on the carriage until the clamping jaws 25$^a$ have been again opened permitting the sealed container to be removed and another placed in position between the open jaws 25$^a$.

As shown in Fig. 14 a disk liner 99 may be placed on the filled bottle before the sealing cap 62 is applied thereby preventing the plastic material from entering the mouth of the bottle.

Fig. 13 illustrates a modification in which the plunger 60$^a$ is formed with a mold cavity 100 in the lower end thereof. When the plunger severs a charge 62 of the plastic material the latter is molded to conform to the shape of the mold cavity. The latter may be of somewhat greater diameter than the mouth end of the bottle so that the plastic is molded around said end. The exterior end surface portion of the bottle neck may be upwardly flared as shown in Figs. 13 and 14 or formed with a bead or other formation by which the plastic cap is securely held in sealing position on the bottle.

Various modifications other than those herein shown or described may be resorted to within the spirit and scope of my invention as defined in the appended claims.

I claim:

1. A method of closing an opening in an article which comprises positioning over and spaced from said opening a mass of moldable plastic material in a moldable condition, moving the mass as a whole into engagement with the wall surface of the article at and surrounding said opening and molding the material to conform to the shape of the said wall surface of the article, and thereafter solidifying the material.

2. The method of sealing the open end of a bottle or other open ended container with a cap comprising a body portion overlying and covering said open end and a marginal flange depending from the body portion and surrounding the said end of the container, which method comprises surrounding said end with a mold cavity conforming to the shape of said marginal flange, severing from a supply body a mass of moldable plastic material in a moldable plastic condition, said mass being sufficient and limited to the volume required for forming the said cap, moving the severed mass as a whole into contact with the said open end of the container and applying a force to the mass by which a portion of the mass is caused to enter and fill the said mold cavity and by which said material is molded to conform to the shape of the open end portion of the container, and thereafter solidifying the material.

3. The method defined in claim 2, said method including the placing of a liner on said open end before the said plastic material is applied and thereby preventing entrance of the said material into the mouth of the container.

4. The method defined in claim 2, the said material being at an elevated temperature at which it is plastic and moldable when applied to the container, said method including cooling the molded material and thereby effecting said solidifying.

5. Apparatus for applying a closure cap to the open neck end of a container, said apparatus comprising a support for the container, a plunger mounted above said support for reciprocating movement toward and from the open end of the container on the support, means for reciprocating the plunger, means cooperating with the plunger for severing a mass of moldable plastic material from a supply body during the downward movement of the plunger, with the mass when severed spaced above the said end of the container, means cooperating with the plunger to form a cap mold with a mold cavity surrounding the said open end of the container, the plunger during its downward movement toward the container cooperating with the cap mold to mold the said mass to the form of a cap closing said mouth of the container.

6. Means for capping an open mouth container comprising an extruder for extruding moldable material in a plastic moldable condition, said extruder comprising a nozzle and a plunger movable up and down, means for supporting the container with said open mouth in register with and spaced below the extruder nozzle, means for moving the plunger downward and thereby projecting the lower end thereof through the nozzle and for severing a mass of the extruded material from a supply body and transferring the severed material to a position over the said mouth of the container, and means cooperating with the plunger during its downward movement to mold the said material to the form of a cap covering and attached to the mouth end of the said container.

7. Apparatus for forming a closure cap and applying it to the open neck end of a container, said apparatus comprising an extruder having a nozzle through which plastic material is extruded, means for supporting the container with said open neck end in register with and spaced from the extrusion nozzle, a plunger, means for reciprocating the plunger within said nozzle toward and from the container neck, said plunger shaped to shear a charge of the extruded material at the mouth of the nozzle during its movement toward the container neck, a cap mold formed with a mold cavity surrounding the open end portion of the container neck, said plunger being operable during said movement toward the container neck and after shearing the extruded charge to press the charge of plastic material within the mold cavity and mold said material to the form of a cap covering and attached to said neck of the container.

8. Apparatus for forming and applying closure caps to the open neck ends of containers, said apparatus comprising an extruder with a downwardly opening nozzle, a plunger mounted for vertical reciprocation within said extruder and thereby movable to a retracted position within the extruder permitting extrusion of the said material, said plunger operable by downward movement to sever a measured mass of the extruded material, means for supporting a container beneath and in register with the said nozzle, a cap mold formed with a mold cavity surrounding the neck end of the container, and means for moving the plunger downwardly and thereby severing the said mass of the plastic material and after said severance forcing it into the mold cavity, thereby molding the material into the form of a cap covering and closing the mouth of the container, the end surface of the plunger being shaped to form a molding surface for molding the top surface of said cap.

9. The apparatus defined in claim 8, the said cap mold comprising separable sections forming a partible mold, and means for moving said sections to and from a molding position.

10. Apparatus for capping bottles or other open mouth articles comprising a carriage mounted for rotation about a vertical axis, article holding devices mounted on the carriage for holding the articles in upright position thereon, an extruder mounted above the carriage, said extruder comprising an arm extending radially of the carriage and an extruder head carried by said arm and having a downwardly facing extrusion nozzle positioned above the path of the said articles, means for rotating the carriage, means for oscillating said arm about the axis of the carriage thereby causing the extruder head to advance through a capping zone while in register with an article on the carriage, a cap mold connected to move with the extruder head, said mold formed with a mold cavity surrounding the neck end of an article while the latter is advancing through the capping zone, and means cooperating with the extruder head to sever a mass of the extruded moldable material and force said material into the mold, thereby molding and fitting a cap on the article passing through the capping zone.

11. The apparatus defined in claim 10, the article holding devices on the carriage each including a pair of gripping jaws, motors individual to said holding devices and operatively connected thereto, and automatic means for controlling the operation of said motors.

12. The apparatus defined in claim 10, the means for severing the extruded masses of the molding material comprising a plunger within the extruder head and mounted for vertical reciprocation, said plunger when in its retracted position having its lower end above the outlet opening of the extruder permitting extrusion of said material, the plunger being operable by its downward movement to shear a predetermined mass of the extruded material from the supply body and force said material downwardly into the cap mold.

13. The combination of an extruder having an outlet opening through which plastic moldable material is extruded, a plunger extending within the extruder and mounted for reciprocation between a retracted position in which the plunger is withdrawn inwardly from the mouth of the extruder permitting plastic material to be extruded through said mouth, the plunger being movable from said retracted position outwardly and shaped to shear unconfined charges of the extruded material at the mouth of the outlet, means for supporting an open mouth article with its open mouth spaced from the extruder outlet and in register therewith, said plunger being operable to force a severed charge of the material on to the said article in position to cover said open mouth.

14. The apparatus defined in claim 13, the end of the plunger being formed with a mold cavity within which the severed mass of extruded material is molded to form a closure cap.

References Cited in the file of this patent

UNITED STATES PATENTS

| | | |
|---|---|---|
| 945,357 | Wilzen | Jan. 4, 1910 |
| 2,346,640 | Anthony | Apr. 18, 1944 |
| 2,403,016 | Noble | July 2, 1946 |
| 2,706,308 | Lorenz | Apr. 19, 1955 |

FOREIGN PATENTS

| | | |
|---|---|---|
| 1,089,952 | France | Mar. 25, 1955 |